US011985916B2

(12) United States Patent
Wang et al.

(10) Patent No.: US 11,985,916 B2
(45) Date of Patent: May 21, 2024

(54) VARIABLE-SIZE AND VARIABLE-AMOUNT TOPDRESSING DEVICE

(71) Applicant: Qingdao Agricultural University, Qingdao (CN)

(72) Inventors: Jiasheng Wang, Qingdao (CN); Zhengguo Lian, Qingdao (CN); Dongwei Wang, Dongying (CN); Ni Hui, Qingdao (CN); Yang Qiao, Qingdao (CN)

(73) Assignee: Qingdao Agricultural University, Qingdao (CN)

( * ) Notice: Subject to any disclaimer, the term of this patent is extended or adjusted under 35 U.S.C. 154(b) by 0 days.

(21) Appl. No.: 18/534,740

(22) Filed: Dec. 11, 2023

(65) Prior Publication Data

US 2024/0099183 A1    Mar. 28, 2024

Related U.S. Application Data

(63) Continuation of application No. PCT/CN2022/085747, filed on Apr. 8, 2022.

(30) Foreign Application Priority Data

Apr. 1, 2022  (CN) .......................... 202210347247.5

(51) Int. Cl.
*A01C 15/00* (2006.01)
*A01C 15/12* (2006.01)
*A01C 19/02* (2006.01)

(52) U.S. Cl.
CPC ............ *A01C 19/02* (2013.01); *A01C 15/008* (2013.01); *A01C 15/12* (2013.01)

(58) Field of Classification Search
CPC ..... A01C 19/02; A01C 15/003; A01C 15/005; A01C 15/006; A01C 15/008; A01C 15/06; A01C 15/12; A01C 15/122; A01C 15/124; B65G 53/40–50
USPC .................................................. 239/650–689
See application file for complete search history.

(56) References Cited

U.S. PATENT DOCUMENTS

2019/0291980 A1*  9/2019  Honeck .................. B65G 65/32
2021/0051845 A1*  2/2021  Hubalek .............. A01C 15/006

* cited by examiner

*Primary Examiner* — Qingzhang Zhou
*Assistant Examiner* — Juan C Barrera

(57) ABSTRACT

Disclosed is a variable-size and variable-amount topdressing device. The device includes a main frame; an image recognition unit; a variable-amount fertilizer applying portion; two electric push rods which are vertically and fixedly connected to inner opposite surfaces of the main frame respectively; and a variable-size fertilizer applying portion arranged at an output end of the variable-amount fertilizer applying portion, where a height of the variable-size fertilizer applying portion is adjusted by the two electric push rods, an output end of the variable-size fertilizer applying portion is arranged corresponding to the output end of the variable-amount fertilizer applying portion, and the variable-size fertilizer applying portion is used for adjusting a fertilizer applying range. The variable-amount fertilizer applying portion, the variable-size fertilizer applying portion and the two electric push rods are electrically connected to the image recognition unit.

5 Claims, 6 Drawing Sheets

VARIABLE-SIZE AND VARIABLE-AMOUNT TOPDRESSING DEVICE

TECHNICAL FIELD

The disclosure belongs to the technical field of agricultural machines, and in particular to a variable-size and variable-amount topdressing device.

BACKGROUND

At present, quantitative large-scale fertilizer distributors are used for most of crop fertilization, which are mainly centrifugal fertilizer spreaders and pneumatic fertilizer spreaders. A topdressing machine is mainly an orchard topdressing machine, which generally performs quantitative deep fertilizer application after trenching. Existing fertilizer application devices, such as centrifugal fertilizer spreaders and pneumatic fertilizer spreaders, are mostly used for applying a base fertilizer, and include disc type fertilizer spreaders, swing arm type fertilizer spreaders, piggyback type fertilizer spreaders, high-clearance fertilizer spreaders (equipped in high-clearance pesticide sprayers), etc. The above fertilizer spreaders can quickly scatter different kinds of fertilizers in a large scattered area by a direct action of a mechanical device or by air pressure, have high operation efficiency, a wide operation area, serious waste, and pollute an environment, and cannot be used for accurate topdressing of crop seedlings. Foliage topdressing is generally applied to fruit trees and cannot be used for precision topdressing of crop seedlings. There is no report about a topdressing machine for cropland seedlings. At present, artificial topdressing is the main method, which has low efficiency and high labor intensity, consumes a lot of labor cost and reduces crop planting benefits, and therefore, mechanical topdressing is an important link to achieve mechanized crop management, and a variable-size and variable-amount topdressing device is urgently needed. A fertilizer box can discharge fertilizers in variable amounts, and a variable-size fertilizer distributor can achieve size changes according to types and sizes of crops, such that the fertilizers can be evenly and accurately scattered around seedlings to avoid burning the seedlings.

SUMMARY

An objective of the disclosure is to provide a variable-size and variable-amount topdressing device, so as to solve the above problems and achieve the purpose of evenly and accurately scattering fertilizers around seedlings to avoid burning the seedlings.

In order to achieve the above objective, the disclosure provides solutions as follows: a variable-size and variable-amount topdressing device includes a main frame;

an image recognition unit arranged at a traveling end of the main frame;

a variable-amount fertilizer applying portion arranged above the main frame, where the variable-amount fertilizer applying portion is used for controlling fertilizer applying amounts of multiple fertilizers;

two groups of electric push rods, where the two groups of electric push rods are vertically and fixedly connected to inner opposite surfaces of the main frame respectively; and a variable-size fertilizer applying portion, where the variable-size fertilizer applying portion is arranged at an output end of the variable-amount fertilizer applying portion, a height of the variable-size fertilizer applying portion is adjusted by the two groups of electric push rods, an output end of the variable-size fertilizer applying portion is arranged corresponding to the output end of the variable-amount fertilizer applying portion, and the variable-size fertilizer applying portion is used for adjusting a fertilizer applying range.

The variable-amount fertilizer applying portion, the variable-size fertilizer applying portion and the two electric push rods are electrically connected to the image recognition unit.

Optionally, the variable-amount fertilizer applying portion includes a fertilizer box, where several fertilizer cavities are provided in the fertilizer box, output ends of several fertilizer cavities are vertically and slidably connected to variable-amount fertilizer discharge control plates, and bottom ends of several variable-amount fertilizer discharge control plates are arranged corresponding to fertilizer discharge openings of several fertilizer cavities. A top of the fertilizer box is provided with several first driving units for driving several variable-amount fertilizer discharge control plates to rise and fall respectively. Several fertilizer discharge openings are in communication with input ends of several fertilizer discharge pipes, and output ends of several fertilizer discharge pipes are arranged corresponding to the variable-size fertilizer applying portion. Several first driving units are electrically connected to the image recognition unit.

Optionally, the variable-size fertilizer applying portion includes a fertilizer distributor connecting frame, a fertilizer distributor linkage rod vertically penetrates a middle end of the fertilizer distributor connecting frame, and a second driving unit for driving the fertilizer distributor linkage rod to rise and fall is arranged above the fertilizer distributor connecting frame. A variable fertilizer distribution unit is arranged between a bottom end of the fertilizer distributor linkage rod and a bottom surface of the fertilizer distributor connecting frame, the second driving unit adjusts an opening degree of the variable fertilizer distribution unit by the fertilizer distributor linkage rod, and an upper part of the variable fertilizer distribution unit is arranged corresponding to the output ends of several fertilizer discharge pipes. The second driving unit is electrically connected to the image recognition unit.

Fixed ends of the electric push rods are fixedly connected to an inner side wall of the main frame, and telescopic ends of the electric push rods are fixedly connected to top surfaces of the two ends of the fertilizer distributor connecting frame.

Optionally, the variable fertilizer distribution unit includes several variable-size fertilizer distributor umbrella type units and several fertilizer distributor supporting rods, and top ends of several variable-size fertilizer distributor umbrella type units are circumferentially hinged at a center of the bottom surface of the fertilizer distributor connecting frame at equal intervals. One ends of several fertilizer distributor supporting rods are circumferentially hinged at a bottom end of the fertilizer distributor linkage rod at equal intervals, and the other ends of several fertilizer distributor supporting rods are correspondingly hinged on inner side walls of several variable-size fertilizer distributor umbrella type units. The fertilizer divider linkage rod is positioned among several variable-size fertilizer distributor umbrella type units, and upper parts of several variable-size fertilizer distributor umbrella type units are arranged corresponding to the output ends of several fertilizer discharge pipes.

Optionally, the second driving unit includes an electric motor frame, a bottom end of the electric motor frame is fixedly connected to a top surface of the fertilizer distributor connecting frame, and a top end of the fertilizer distributor connecting frame is fixedly connected to a fertilizer distributor stepping motor. A rotating shaft of the fertilizer distributor stepping motor is connected to a first rotary disc by a key, and a first connecting rod is hinged between the first rotary disc and the fertilizer distributor linkage rod. A top end of the first connecting rod is positioned at an edge of the first rotary disc, a bottom end of the first connecting rod is positioned at the top end of the fertilizer distributor linkage rod, and the fertilizer distributor stepping motor is electrically connected to the image recognition unit.

Optionally, the first driving unit includes an electric motor bracket, and the electric motor bracket is fixedly connected to an outer side wall of a top end of the fertilizer box. A top surface of the electric motor bracket is fixedly connected to a fertilizer discharge machine stepping motor, and a rotating shaft of the fertilizer discharge machine stepping motor is connected to a second rotary disc by a key. A second connecting rod is hinged between the second rotary disc and the variable-amount fertilizer discharge control plate, a top end of the second connecting rod is positioned at an edge of the second rotary disc, and a bottom end of the second connecting rod is positioned at a top end of the variable-amount fertilizer discharge control plate. The fertilizer discharge machine stepping motor is electrically connected to the image recognition unit.

Optionally, a size of the bottom end of the variable-amount fertilizer discharge control plate is greater than that of the fertilizer discharge opening.

Optionally, a bottom surface of an inner side of the fertilizer cavity is arranged obliquely, and the fertilizer discharge opening is positioned at a lower end of the fertilizer cavity.

The disclosure has following technical effects: The image recognition unit is mainly used for collecting field crop information in real time, analyzing the growth conditions, the size and the type of crops, selecting corresponding fertilizer applying amount information according to analysis results, and converting the fertilizer applying amount information into a starting signal to the two electric push rods, the variable-amount fertilizer applying portion and the variable-size fertilizer applying portion. The variable-amount fertilizer applying portion is mainly used for releasing the corresponding amounts of fertilizers after receiving the starting signal. The two electric push rods and the variable-size fertilizer applying portions are mainly used for controlling a lifting height of the variable-size fertilizer applying portion and the opening degree of the variable-size fertilizer applying portion after receiving the starting signal, so as to accurately control falling points of the fertilizers. The problems including fertilizer waste and seedling burning may be effectively solved by controlling distances between the fertilizers and crops, such that the topdressing efficiency and the topdressing quality of the crops are improved. The variable-amount fertilizer applying portion improves the adaptability of the topdressing device by controlling the output amounts of various fertilizers, that is, the topdressing device may apply fertilizers to various crops. The fertilizer applying efficiency is improved on the whole, and the manual labor intensity is reduced.

BRIEF DESCRIPTION OF THE DRAWINGS

To describe the technical solutions in the embodiments of the disclosure or in the prior art more clearly, the following briefly describes the accompanying drawings required in the embodiments. Apparently, the accompanying drawings in the following descriptions show merely some embodiments of the disclosure, and those of ordinary skill in the art may still derive other accompanying drawings from the accompanying drawings without creative efforts.

In the figures, 1. fertilizer distributor stepping motor; 2. electric motor frame; 3. first rotary disc; 4. first connecting rod; 5. fertilizer distributor connecting frame; 6. fertilizer distributor linkage rod; 7. fertilizer distributor supporting rod; 8. variable-size fertilizer distributor umbrella type unit; 9. fertilizer box; 10. camera; 11. fertilizer discharge pipe; 12. fertilizer discharge machine stepping motor; 13. electric motor bracket; 14. fertilizer discharge opening; 15. second rotary disc; 16. second connecting rod; 17. variable-amount fertilizer discharge control plate; 18. fixing frame; 19. main frame; 20. electric push rod; 21. telescopic end; and 22. wheel.

DETAILED DESCRIPTION OF THE EMBODIMENTS

The technical solutions in the embodiments of the disclosure are clearly and completely described below with reference to the accompanying drawings in the embodiments of the disclosure. Obviously, the described examples are merely some embodiments rather than all examples of the disclosure. All the other embodiments obtained by those of ordinary skill in the art based on the embodiments in the disclosure without creative efforts shall fall within the scope of protection of the disclosure.

To make the above-mentioned objective, features and advantages of the disclosure clearer and more comprehensible, the following further describes the disclosure in detail with reference to the accompanying drawings and embodiments.

Figure 1:
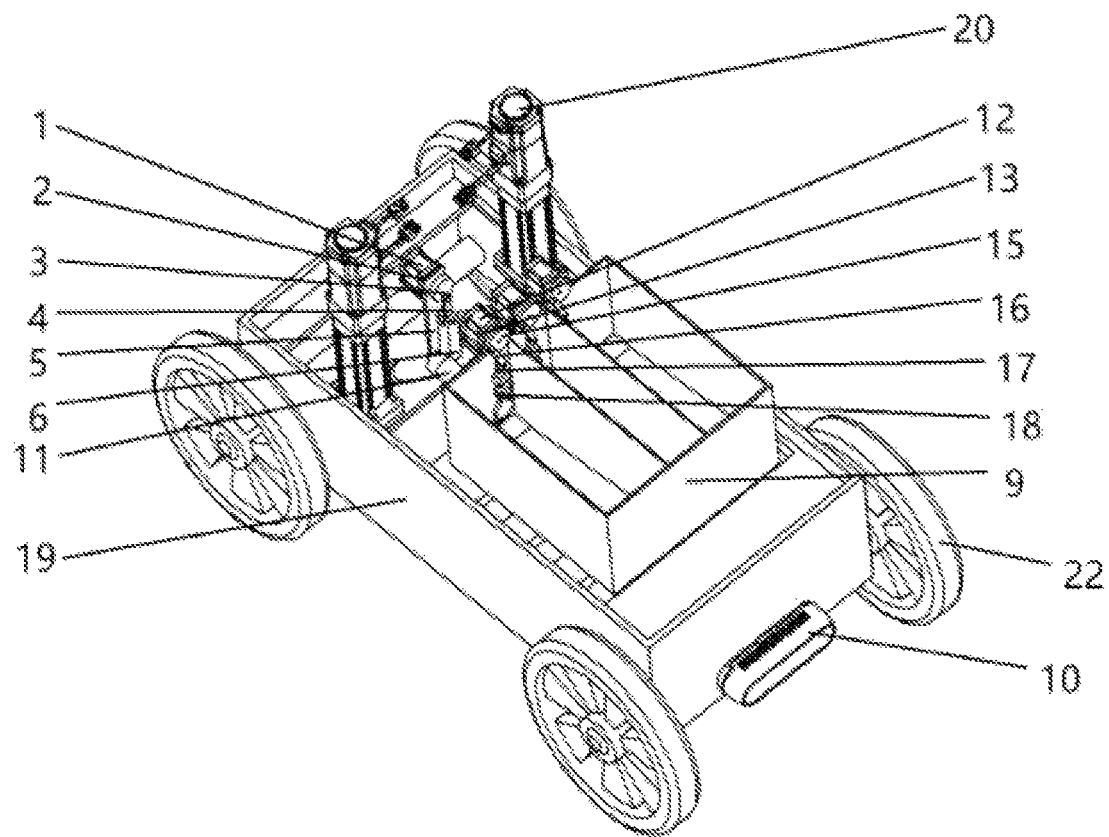
FIG. 1 is an axonometric drawing of a variable-size and variable-amount fertilizer discharge device of the disclosure.
Figure 2:
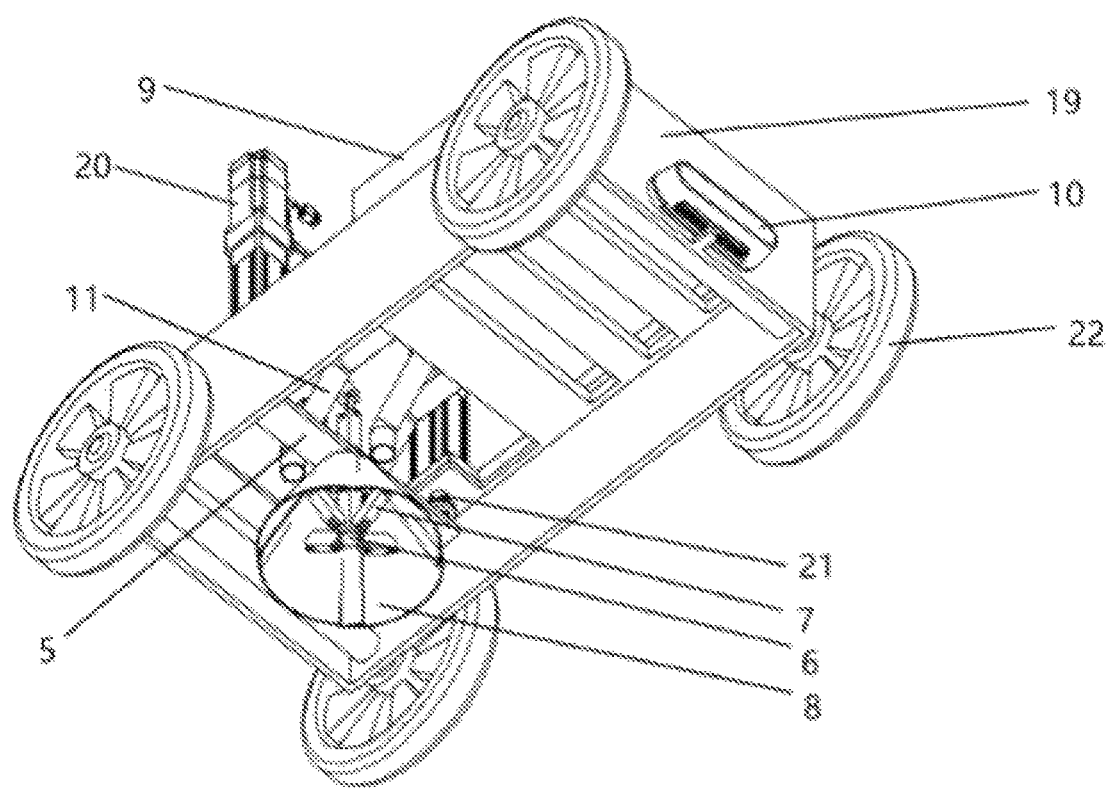
FIG. 2 is an axonometric drawing from another angle of a variable-size and variable-amount fertilizer discharge device of the disclosure.
Figure 3:
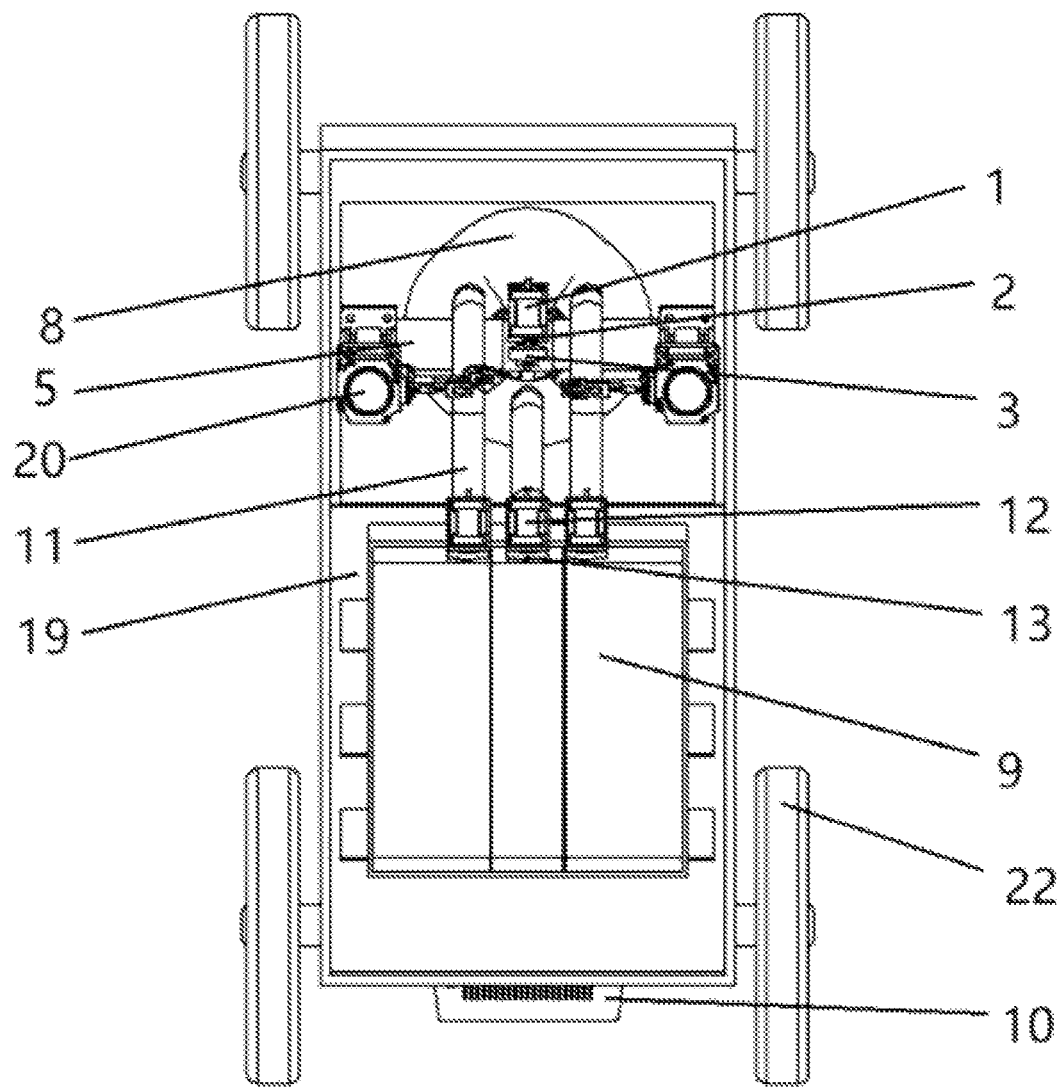
FIG. 3 is a top view of a variable-size and variable-amount fertilizer discharge device of the disclosure.
Figure 4:
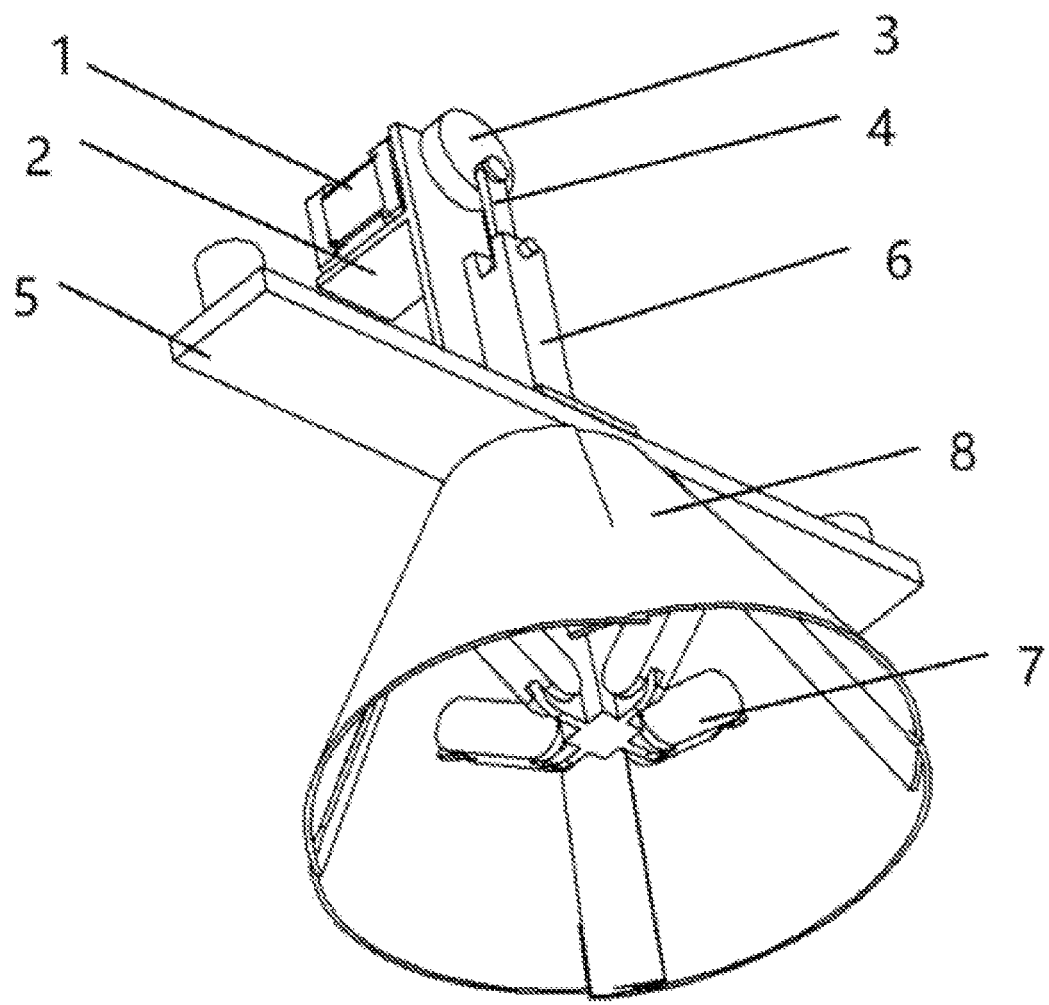
FIG. 4 is a schematic diagram of a variable-size fertilizer applying portion of the disclosure.
Figure 5:
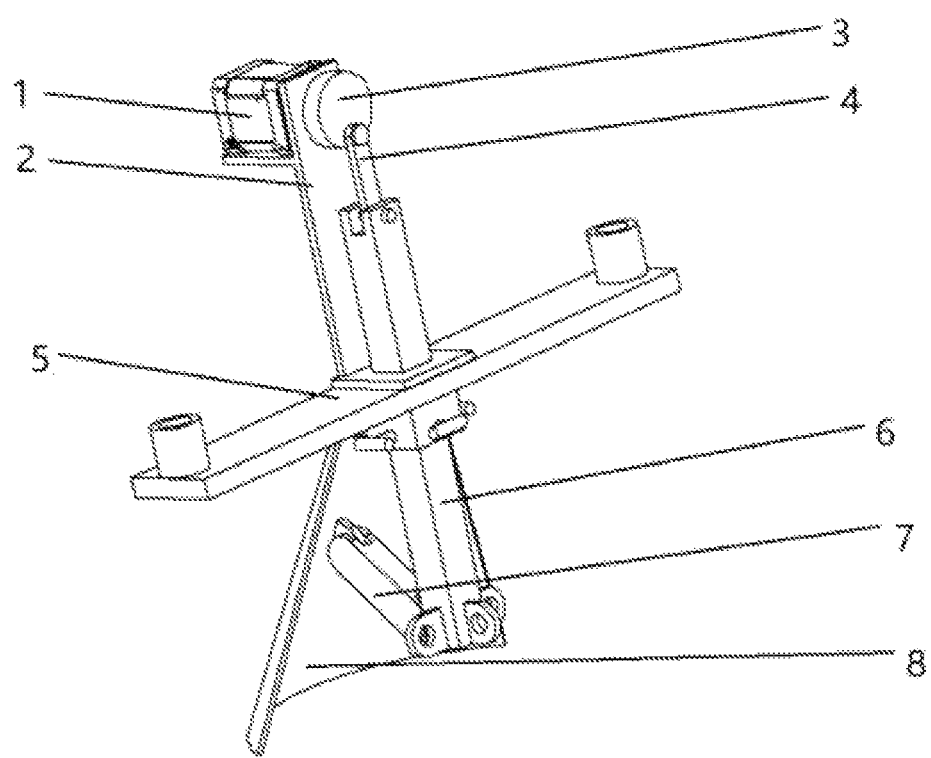
FIG. 5 is a schematic diagram of an internal structure of a variable-size fertilizer applying portion of the disclosure.
Figure 6:
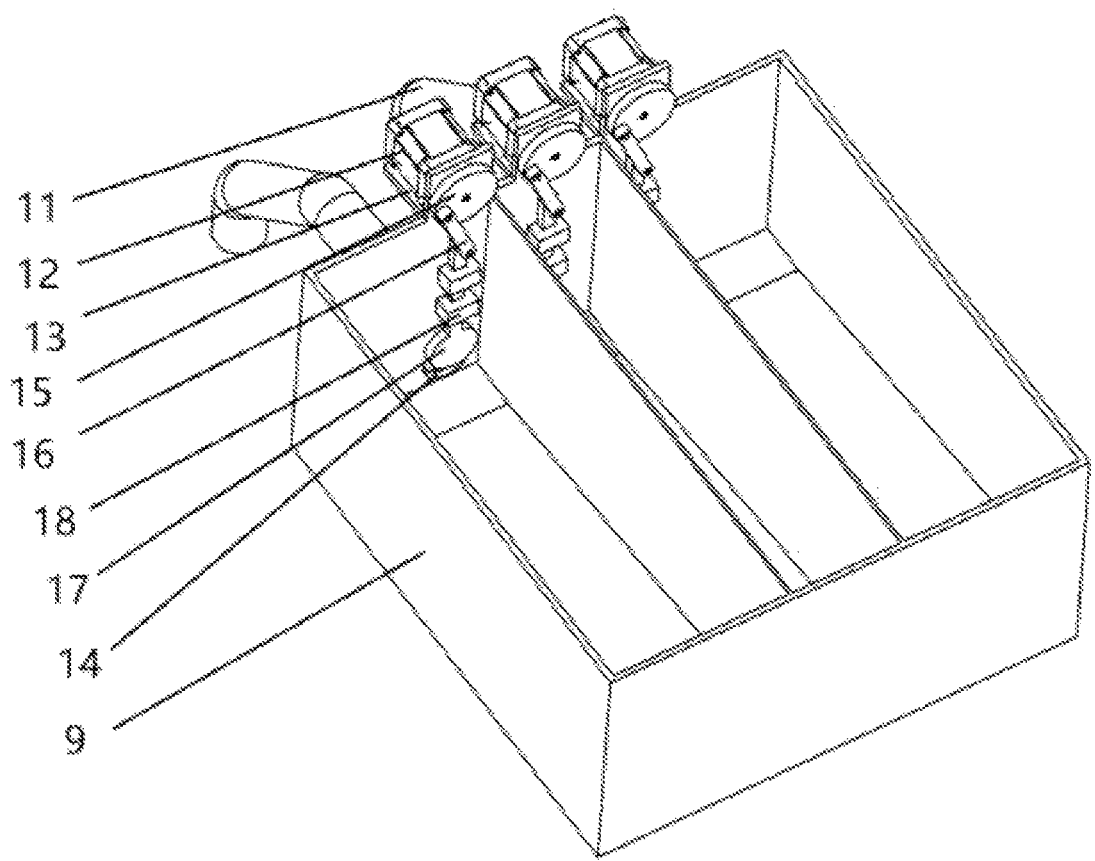
FIG. 6 is a schematic structural diagram of a variable-amount fertilizer applying portion of the disclosure.

Referring to FIGS. 1-6, the disclosure provides a variable-size and variable-amount topdressing device. The device includes a main frame 19;

an image recognition unit arranged at a traveling end of the main frame 19;

a variable-amount fertilizer applying portion arranged above the main frame 19 and used for controlling fertilizer applying amounts of multiple fertilizers;

two electric push rods 20, where the two electric push rods 20 are vertically and fixedly connected to inner opposite surfaces of the main frame 19 respectively; and a variable-size fertilizer applying portion arranged at an output end of the variable-amount fertilizer applying portion, where a height of the variable-size fertilizer applying portion is adjusted by the two electric push rods 20, an output end of the variable-size fertilizer applying portion is arranged corresponding to the output end of the variable-amount fertilizer applying portion, and the variable-size fertilizer applying portion is used for adjusting a fertilizer applying range.

The variable-amount fertilizer applying portion, the variable-size fertilizer applying portion and the two electric push rods 20 are electrically connected to the image recognition unit.

The image recognition unit is mainly used for collecting field crop information in real time, analyzing crop growth conditions, crop sizes and crop types, selecting corresponding fertilizer applying amount information according to analysis results, and converting the fertilizer applying amount information into a starting signal to the two electric push rods 20, the variable-amount fertilizer applying portion and the variable-size fertilizer applying portion. The variable-amount fertilizer applying portion is mainly used for releasing the corresponding amounts of fertilizers after receiving the starting signal. The two electric push rods 20 and the variable-size fertilizer applying portions are mainly used for controlling a lifting height of the variable-size fertilizer applying portion and the opening degree of the variable-size fertilizer applying portion after receiving the starting signal, so as to accurately control falling points of the fertilizers. The problems of fertilizer waste, seedling burning, etc. may be effectively solved by controlling distances between the fertilizers and crops, such that the topdressing efficiency and the topdressing quality of the crops are improved. The variable-amount fertilizer applying portion improves the adaptability of the topdressing device by controlling the output amounts of various fertilizers, that is, the topdressing device may apply fertilizers to various crops.

As a further optimization scheme, the variable-amount fertilizer applying portion includes a fertilizer box 9, where three fertilizer cavities are provided in the fertilizer box 9, and output ends of the three fertilizer cavities are vertically and slidably connected to variable-amount fertilizer discharge control plates 17. Bottom ends of the three variable-amount fertilizer discharge control plates 17 are arranged corresponding to fertilizer discharge openings 14 of the three fertilizer cavities, and a top of the fertilizer box 9 is provided with three first driving units for driving the three variable-amount fertilizer discharge control plates 17 to rise and fall respectively. The three fertilizer discharge openings 14 are in communication with input ends of three fertilizer discharge pipes 11, output ends of the three fertilizer discharge pipes 11 are arranged corresponding to the variable-size fertilizer applying portion, and the three first driving units are electrically connected to the image recognition unit.

Nitrogen, phosphorus and potassium fertilizers are added to the three fertilizer cavities respectively. When the three first driving units receive the starting signal, the three variable-amount fertilizer discharge control plates 17 are driven to rise and fall at corresponding heights, that is, opening and closing of the fertilizer discharge openings 14 are controlled, so as to control release amounts of corresponding fertilizers. An effective stroke of the three variable-amount fertilizer discharge control plates 17 is 30 mm.

As a further optimization scheme, the variable-size fertilizer applying portion includes a fertilizer distributor connecting frame 5, a fertilizer distributor linkage rod 6 vertically penetrates a middle end of the fertilizer distributor connecting frame 5, and a second driving unit for driving the fertilizer distributor linkage rod 6 to rise and fall is arranged above the fertilizer distributor connecting frame 5. A variable fertilizer distribution unit is arranged between a bottom end of the fertilizer distributor linkage rod 6 and a bottom surface of the fertilizer distributor connecting frame 5, and the second driving unit adjusts an opening degree of the variable fertilizer distribution unit by the fertilizer distributor linkage rod 6. An upper part of the variable fertilizer distribution unit is arranged corresponding to the output ends of several fertilizer discharge pipes 11, and the second driving unit is electrically connected to the image recognition unit.

Fixed ends of the electric push rods 20 are fixedly connected to an inner side wall of the main frame 19, and telescopic ends of the electric push rods 20 are fixedly connected to top surfaces of the two ends of the fertilizer distributor connecting frame 5.

When the two electric push rods 20 and the second driving unit receive the starting signal, the two electric push rods 20 drive the fertilizer distributor connecting frame 5 to rise or fall to reciprocate, so as to control a fertilizer applying height. The second driving unit controls the opening degree of the variable fertilizer distribution unit by driving the fertilizer distributor linkage rod 6 to rise and fall, so as to satisfy agronomic requirements of topdressing crops. An angle of the variable fertilizer distribution unit relative to a vertical direction ranges from 48 to 68. Mounting positions of the two electric push rods 20 are 150 cm away from the ground, and an effective stroke of the telescopic ends of the two electric push rods 20 is 150 cm, such that distances between falling points of the fertilizers and the crops may be controlled more accurately, and the purpose of high efficiency fertilizer applying may be achieved.

As a further optimization scheme, the variable fertilizer distribution unit includes four variable-size fertilizer distributor umbrella type units 8 and four fertilizer distributor supporting rods 7, top ends of the four variable-size fertilizer distributor umbrella type units 8 are circumferentially hinged at a center of the bottom surface of the fertilizer distributor connecting frame 5 at equal intervals, one ends of the four fertilizer distributor supporting rods 7 are circumferentially hinged at a bottom end of the fertilizer distributor linkage rod 6 at equal intervals, and the other ends of the four fertilizer distributor supporting rods 7 are correspondingly hinged on inner side walls of the four variable-size fertilizer distributor umbrella type units 8. The fertilizer divider linkage rod 6 is positioned among the four variable-size fertilizer distributor umbrella type units 8, and upper parts of the four variable-size fertilizer distributor umbrella type units 8 are arranged corresponding to the output ends of the three fertilizer discharge pipes 11.

When the fertilizer distributor linkage rod 6 is driven to rise and fall by the second driving unit, the four variable-size fertilizer distributor umbrella type units 8 are opened by the four fertilizer distributor supporting rods 7, such that the purpose of adjusting the opening degree of the variable-size fertilizer distribution unit is achieved. A diameter size of a bottom of the variable-size fertilizer distributor umbrella type unit 8 ranges from 9.5 cm to 13.5 cm.

As a further optimization scheme, the second driving unit includes an electric motor frame 2, a bottom end of the electric motor frame 2 is fixedly connected to a top surface of the fertilizer distributor connecting frame 5, and a top end of the fertilizer distributor connecting frame 5 is fixedly connected to a fertilizer distributor stepping motor 1. A rotating shaft of the fertilizer distributor stepping motor 1 is connected to a first rotary disc 3 by a key, and a first connecting rod 4 is hinged between the first rotary disc 3 and the fertilizer distributor linkage rod 6. A top end of the first connecting rod 4 is positioned at an edge of the first rotary disc 3, a bottom end of the first connecting rod 4 is positioned at a top end of the fertilizer distributor linkage rod 6, and the fertilizer distributor stepping motor 1 is electrically connected to the image recognition unit.

As a further optimization scheme, the first driving unit includes an electric motor bracket 13, and the electric motor bracket 13 is fixedly connected to an outer side wall of a top end of the fertilizer box 9. A top surface of the electric motor bracket 13 is fixedly connected to a fertilizer discharge machine stepping motor 12, and a rotating shaft of the fertilizer discharge machine stepping motor 12 is connected to a second rotary disc 15 by a key. A second connecting rod 16 is hinged between the second rotary disc 15 and the variable-amount fertilizer discharge control plate 17, a top end of the second connecting rod 16 is positioned at an edge of the second rotary disc 15, and a bottom end of the second connecting rod 16 is positioned at a top end of the variable-amount fertilizer discharge control plate 17. The fertilizer discharge machine stepping motor 12 is electrically connected to the image recognition unit.

As a further optimization scheme, a size of the bottom end of the variable-amount fertilizer discharge control plate 17 is greater than that of the fertilizer discharge opening 14.

As a further optimization scheme, a bottom surface of an inner side of the fertilizer cavity is arranged obliquely, and the fertilizer discharge opening 14 is positioned at a lower end of the fertilizer cavity. An included angle between a bottom surface of an inner side of the fertilizer cavity and a horizontal plane is 30°, which is convenient for the fertilizer to move to the lower end.

As a further optimization scheme, several fixing frames 18 are vertically and fixedly connected to an inner side wall of an output end of the fertilizer box 9, and a middle end of the variable-amount fertilizer discharge control plate 17 penetrates several fixing frames 18.

Under an action of the fixing frame 18, the opening and closing states of the variable-amount fertilizer discharge control plate 17 and the fertilizer discharge opening 14 may be more stable, and gaps which affect precision of fertilizer release may be avoided.

As a further optimization scheme, four corners of a bottom of the main frame 19 are rotationally connected with wheels 22 respectively, and the four wheels 22 are driven by electric power.

As a further optimization scheme, a bottom end of the electric push rod 20 is provided with a telescopic end 21, and the telescopic end 21 is fixedly connected to a top surface of the fertilizer distributor connecting frame 5.

As a further optimization scheme, the image recognition unit includes a camera 10, where the camera 10 is fixedly connected to a traveling end of the main frame 19. The camera 10 is electrically connected to a computer control system, and the computer control system is electrically connected to the fertilizer distributor stepping motor 1, the fertilizer discharge machine stepping motor 12 and the electric push rod 20. The computer control system may employ an existing personal computer (PC), and the method and process for analyzing and processing image information are of an existing technology, which is not described in detail here. A storage battery is arranged in the main frame 19 to provide electric energy for the PC, the camera 10, the fertilizer distributor stepping motor 1, the fertilizer discharge machine stepping motor 12 and the electric push rod 20.

The working process of this example is as follows:

In an advancing process of the machine, the camera 10 collects field crop information, transmits the image information to the computer control system, and the compute control system analyzes the images, identifies the growth condition, the size and the type of the crops. The fertilizer amount required by the crops is obtained by calculation, and a reasonable size of topdressing of the crops is obtained according to the size of the crops. The above data is converted into control over the fertilizer distributor stepping motor 1 and the fertilizer discharge machine stepping motor 12. A processor in the computer control system controls the fertilizer distributor stepping motor 1 to rotate at a proper angle to drive the first rotary disc 3 to rotate, and the first connecting rod 4 is lifted or lowered along with the rotation of the first rotary disc 3. The first connecting rod 4 pulls the fertilizer distributor linkage rod 6 to move up and down at the center of the fertilizer distributor connecting frame 5, and the rotation motion of the fertilizer distributor stepping motor 1 is changed into reciprocating linear motion. The fertilizer distributor linkage rod 6 drives the four fertilizer distributor supporting rods 7 to rotate, the four fertilizer distributor supporting rods 7 may lift or lower the variable-size fertilizer distributor umbrella type units 8 mounted on the fertilizer distributor connecting frame 5, so as to change the overall size of the variable-size fertilizer applying portion, and the variable fertilizer distribution unit may cover the crops. Similarly, the processor may also control the fertilizer discharge machine stepping motor 12 to drive the variable-amount fertilizer discharge control plate 17 to move up and down by rotation, so as to change the fertilizer discharge amount. The fertilizer enters the fertilizer discharge opening 14 from the fertilizer box 9 and falls right above the variable fertilizer distribution unit by the fertilizer discharge pipe 11, such that the fertilizer falls evenly and accurately around the crops.

In the description of the disclosure, it needs to be understood that the orientation or positional relations indicated by the terms "longitudinal", "transverse", "up", "down", "front", "rear", "left", "right", "vertical", "horizontal", "top", "bottom", "inside", "outside", etc. are based on the orientation or positional relations shown in the accompanying drawings, are merely for facilitating the description of the disclosure, rather than indicating or implying the an apparatus or element referred to must have a particular orientation or be constructed and operated in a particular orientation, and therefore will not be interpreted as limiting the disclosure.

The above-described examples are only a description of preferred modes of the disclosure and do not limit the scope of the disclosure, and various variations and modifications made by those of ordinary skill in the art to the technical solution of the disclosure are intended to fall within the protection scope defined by the claims of the disclosure without departing from the design spirit of the disclosure.

What is claimed is:

1. A variable-size and variable-amount topdressing device, comprising
    a main frame (19);
    an image recognition unit, wherein the image recognition unit is arranged at a traveling end of the main frame (19);
    a variable-amount fertilizer applying portion, wherein the variable-amount fertilizer applying portion is arranged above the main frame (19) and the variable-amount fertilizer applying portion is used for controlling fertilizer applying amounts of multiple fertilizers;
    two electric push rods (20), wherein the two electric push rods (20) are vertically and fixedly connected to inner opposite surfaces of the main frame (19) respectively;

a variable-size fertilizer applying portion, wherein the variable-size fertilizer applying portion is arranged at an output end of the variable-amount fertilizer applying portion, a height of the variable-size fertilizer applying portion is adjusted by the two electric push rods (20), an output end of the variable-size fertilizer applying portion is arranged corresponding to the output end of the variable-amount fertilizer applying portion, and the variable-size fertilizer applying portion is used for adjusting a fertilizer applying range;

the variable-amount fertilizer applying portion, the variable-size fertilizer applying portion and the two electric push rods (20) are electrically connected to the image recognition unit;

the variable-amount fertilizer applying portion comprises a fertilizer box (9), wherein several fertilizer cavities are provided in the fertilizer box (9), output ends of the several fertilizer cavities are vertically and slidably connected to variable-amount fertilizer discharge control plates (17), bottom ends of several variable-amount fertilizer discharge control plates (17) are arranged corresponding to fertilizer discharge openings (14) of the several fertilizer cavities, a top of the fertilizer box (9) is provided with several first driving units for driving the several variable-amount fertilizer discharge control plates (17) to rise and fall respectively, several fertilizer discharge openings (14) are in communication with input ends of several fertilizer discharge pipes (11), output ends of the several fertilizer discharge pipes (11) are arranged corresponding to the variable-size fertilizer applying portion, and the several first driving units are electrically connected to the image recognition unit;

the variable-size fertilizer applying portion comprises a fertilizer distributor connecting frame (5), a fertilizer distributor linkage rod (6) vertically penetrates a middle end of the fertilizer distributor connecting frame (5), a second driving unit for driving the fertilizer distributor linkage rod (6) to rise and fall is arranged above the fertilizer distributor connecting frame (5), a variable fertilizer distribution unit is arranged between a bottom end of the fertilizer distributor linkage rod (6) and a bottom surface of the fertilizer distributor connecting frame (5), the second driving unit adjusts an opening degree of the variable fertilizer distribution unit by the fertilizer distributor linkage rod (6), an upper part of the variable fertilizer distribution unit is arranged corresponding to the output ends of the several fertilizer discharge pipes (11), and the second driving unit is electrically connected to the image recognition unit;

fixed ends of the electric push rods (20) are fixedly connected to an inner side wall of the main frame (19), and telescopic ends of the electric push rods (20) are fixedly connected to top surfaces of two ends of the fertilizer distributor connecting frame (5); and the variable fertilizer distribution unit comprises several variable-size fertilizer distributor umbrella type units (8) and several fertilizer distributor supporting rods (7), top ends of the several variable-size fertilizer distributor umbrella type units (8) are circumferentially hinged at a center of the bottom surface of the fertilizer distributor connecting frame (5) at equal intervals, one ends of the several fertilizer distributor supporting rods (7) are circumferentially hinged at a bottom end of the fertilizer distributor linkage rod (6) at equal intervals, the other ends of the several fertilizer distributor supporting rods (7) are correspondingly hinged on inner side walls of the several variable-size fertilizer distributor umbrella type units (8), the fertilizer divider linkage rod (6) is positioned among the several variable-size fertilizer distributor umbrella type units (8), and upper parts of the several variable-size fertilizer distributor umbrella type units (8) are arranged corresponding to the output ends of the several fertilizer discharge pipes (11).

2. The variable-size and variable-amount topdressing device according to claim 1, wherein the second driving unit comprises an electric motor frame (2), a bottom end of the electric motor frame (2) is fixedly connected to a top surface of the fertilizer distributor connecting frame (5), a top end of the fertilizer distributor connecting frame (5) is fixedly connected to a fertilizer distributor stepping motor (1), a rotating shaft of the fertilizer distributor stepping motor (1) is connected to a first rotary disc (3) by a key, a first connecting rod (4) is hinged between the first rotary disc (3) and the fertilizer distributor linkage rod (6), a top end of the first connecting rod (4) is positioned at an edge of the first rotary disc (3), a bottom end of the first connecting rod (4) is positioned at a top end of the fertilizer distributor linkage rod (6), and the fertilizer distributor stepping motor (1) is electrically connected to the image recognition unit.

3. The variable-size and variable-amount topdressing device according to claim 1, wherein the first driving unit comprises an electric motor bracket (13), the electric motor bracket (13) is fixedly connected to an outer side wall of a top end of the fertilizer box (9), a top surface of the electric motor bracket (13) is fixedly connected to a fertilizer discharge machine stepping motor (12), a rotating shaft of the fertilizer discharge machine stepping motor (12) is connected to a second rotary disc (15) by a key, a second connecting rod (16) is hinged between the second rotary disc (15) and the variable-amount fertilizer discharge control plate (17), a top end of the second connecting rod (16) is positioned at an edge of the second rotary disc (15), a bottom end of the second connecting rod (16) is positioned at a top end of the variable-amount fertilizer discharge control plate (17), and the fertilizer discharge machine stepping motor (12) is electrically connected to the image recognition unit.

4. The variable-size and variable-amount topdressing device according to claim 1, wherein a size of the bottom end of the variable-amount fertilizer discharge control plate (17) is greater than a size of the fertilizer discharge opening (14).

5. The variable-size and variable-amount topdressing device according to claim 1, wherein a bottom surface of an inner side of the fertilizer cavity is arranged obliquely, and the fertilizer discharge opening (14) is positioned at a lower end of the fertilizer cavity.

\* \* \* \* \*